(12) United States Patent
Kumazaki et al.

(10) Patent No.: US 8,267,476 B2
(45) Date of Patent: Sep. 18, 2012

(54) VEHICLE SEAT RECLINING DEVICE

(75) Inventors: Yoshiyuki Kumazaki, Aichi-ken (JP); Shinji Nonaka, Toyota (JP)

(73) Assignee: Toyota Boshoku Kabushiki Kaisha, Aichi-Ken ( * ) Notice: Subject to any disclaimer, the term of this patent is extended or adjusted under 35 U.S.C. 154(b) by 155 days.

(21) Appl. No.: 12/739,036

(22) PCT Filed: Jul. 8, 2008

(86) PCT No.: PCT/JP2008/062322
§ 371 (c)(1),
(2), (4) Date: Jul. 19, 2010

(87) PCT Pub. No.: WO2009/060641
PCT Pub. Date: May 14, 2009

(65) Prior Publication Data
US 2010/0276976 A1   Nov. 4, 2010

(30) Foreign Application Priority Data
Nov. 9, 2007   (JP) ................... 2007-291887

(51) Int. Cl.
B60N 2/20    (2006.01)
B60N 2/22    (2006.01)
B60N 2/235   (2006.01)

(52) U.S. Cl. .................. 297/367 P; 297/367 R

(58) Field of Classification Search .............. 297/367 R, 297/367 P, 367 L
See application file for complete search history.

(56) References Cited

U.S. PATENT DOCUMENTS

| | | | |
|---|---|---|---|
| 5,681,086 A | 10/1997 | Baloche | |
| 5,690,386 A * | 11/1997 | Chabanne | 297/367 R |
| 6,390,557 B1 * | 5/2002 | Asano | 297/367 R |
| 6,652,031 B2 * | 11/2003 | Villarroel et al. | 297/367 R |
| 6,669,297 B2 * | 12/2003 | Cilliere et al. | 297/367 R |
| 6,733,077 B2 * | 5/2004 | Asano | 297/367 R |
| 6,742,844 B2 * | 6/2004 | Pollack | 297/367 R |
| 6,854,802 B2 * | 2/2005 | Matsuura et al. | 297/367 R |
| 6,910,737 B2 * | 6/2005 | Hosokawa | 297/367 R |
| 7,066,541 B2 * | 6/2006 | Uramichi | 297/367 R |
| 7,222,919 B2 * | 5/2007 | Uramichi et al. | 297/367 R |
| 7,341,311 B2 * | 3/2008 | Ohba | 297/367 R |
| 7,478,881 B2 * | 1/2009 | Leconte | 297/367 R |
| 7,744,157 B2 * | 6/2010 | Ishihara et al. | 297/367 P |
| 7,819,471 B2 * | 10/2010 | Ishihara et al. | 297/367 P X |
| 2003/0102704 A1 * | 6/2003 | Pollack | 297/367 |
| 2003/0178879 A1 * | 9/2003 | Uramichi | 297/367 |
| 2005/0264076 A1 * | 12/2005 | Uramichi et al. | 297/367 |
| 2007/0170765 A1 * | 7/2007 | Vossmann et al. | 297/367 |
| 2009/0134682 A1 | 5/2009 | Andou et al. | |
| 2010/0026072 A1 | 2/2010 | Uramichi et al. | |
| 2010/0150645 A1 | 6/2010 | Endo et al. | |

FOREIGN PATENT DOCUMENTS

| | | |
|---|---|---|
| JP | 03-36285 | 8/1991 |
| JP | 08-253063 | 10/1996 |
| JP | 2007-130237 | 5/2007 |
| WO | WO 2007094444 A1 * | 8/2007 |

\* cited by examiner

*Primary Examiner* — Rodney B White
(74) *Attorney, Agent, or Firm* — Greenblum & Bernstein, P.L.C.

(57) ABSTRACT

Each of the pawls that are capable of rotationally locking a reclining device has a hardness greater than a slide cam that is capable of pressing the pawls to engage a ratchet. When a large load capable of forcibly rotationally displacing the ratchet is applied thereto while the pawls mesh with the ratchet, the pawls are pressed by the ratchet in a radially inward direction in which the pawls are disengaged therefrom, so as to press the slide cam with an increased buckling strength and plastically deform the same.

4 Claims, 7 Drawing Sheets

VEHICLE SEAT RECLINING DEVICE

TECHNICAL FIELD

The present invention relates to a vehicle seat reclining device. More particularly, the present invention relates to a vehicle seat reclining device that is capable of connecting a seat back of a vehicle seat to a fixed body such as a seat cushion and a floor such that a tilt angle of the seat back can be adjusted.

BACKGROUND ART

A vehicle seat is conventionally known. In the vehicle seat, a seat back is connected to a seat cushion via a reclining device such that a tilt angle of the seat back can be adjusted. A structure of the reclining device described above is taught by Japanese Laid-Open Patent Publication Number 2007-130237 in detail. The reclining device described therein includes a disk-shaped ratchet that is integrally connected to a frame of the seat back, and a disk-shaped guide that is integrally connected to a frame of the seat cushion. The ratchet and the guide are axially assembled while they are mutually supported so as to rotate relative to each other.

Pawls are disposed between the ratchet and the guide. Each of the pawls has outwardly-faced teeth that are formed in an outer circumferential portion thereof. The pawls are supported on the guide so as to only move radially inwardly and outwardly of the guide. The pawls can be pressed and moved radially outwardly when a slide cam disposed in a central portion of the guide is moved. As a result, outer circumferential toothed surfaces of the pawls can mesh with inner circumferential toothed surfaces that are formed in a projected cylindrical portion of the ratchet, so that a relative rotation of the ratchet and the guide can be locked.

In particular, the slide cam capable of pressing and moving the pawls radially outwardly is normally spring biased in such a direction to press and move the pawls radially outwardly. Therefore, such a biasing force can ensure a locking strength that is capable of maintaining a condition in which the pawls and the ratchet engage each other.

According to the conventional art described above, when a large load capable of causing a rotational displacement of the ratchet is applied to the seat back due to, for example, a collision of a heavy article against the seat back, such a load functions as a force that can forcibly rotationally displace the ratchet that is maintained in a locked condition by engagement. That is, the force may function to release an engaged condition of the pawls and the ratchet or to rotate the pawls with the ratchet. Thus, a support structure of the pawls by the slide cam can be broken. As a result, the locking strength that is capable of bearing the large load applied to the seat back cannot be obtained.

Thus, there is a need in the art to increase a locking strength of a reclining device.

SUMMARY OF THE INVENTION

A vehicle seat reclining device of the present invention is a vehicle seat reclining device that is capable of connecting a seat back of a vehicle seat to a fixed body such as a seat cushion and a floor such that a tilt angle of the seat back can be adjusted. The vehicle seat reclining device includes two connecting elements, engagement teeth members and a pressure cam. The two connecting elements respectively having disk-shaped portions that are respectively integrally connected to the seat back or the fixed body and are oppositely coupled to each other so as to be rotatable relative to each other. The engagement teeth members are disposed between the two connecting elements. The engagement teeth members are attached to one of the connecting elements while circumferentially supported, so as to prohibit relative rotation of the connecting elements when outer circumferential toothed surfaces formed therein are meshed with inner circumferential toothed surfaces formed in the other of the connecting elements. The pressure cam is capable of pressing the engagement teeth members radially outwardly when moved by biasing, so as to mesh with the inner circumferential toothed surfaces formed in the other of the connecting elements. Each of the engagement teeth members has a hardness greater than the pressure cam. When a large load capable of forcibly rotationally displacing the other of the connecting elements is applied thereto while the engagement teeth members engage the other of the connecting elements, the engagement teeth members are pressed by the other of the connecting elements in a radially inward direction in which the engagement teeth members are disengaged therefrom, so as to press the pressure cam with an increased buckling strength and plastically deform the same.

According to the structure of the present invention, when the large load capable of forcibly rotationally displacing the other of the connecting elements is applied thereto due to, for example, a collision of a heavy article against the seat back, the engagement teeth members are subjected to a pressing force from the other of the connecting elements in the radially inward direction in which the engagement teeth members are disengaged therefrom. However, the pressing force can be absorbed because the engagement teeth members can press the pressure cam and plastically deform the same. In particular, because each of the engagement teeth members has a hardness greater than the pressure cam, the engagement teeth members can plastically deform the pressure cam without buckling. Therefore, the engagement teeth members can receive the large load while maintaining a condition in which they are supported by the pressure cam. Thus, it is possible to maintain the condition in which the engagement teeth members are supported by the pressure cam without buckling. Therefore, a locking strength of the reclining device can be increased.

The present invention can be constructed as follows. That is, the pressure cam is attached to one of the connecting elements so as to move in a direction perpendicular to moving directions of the engagement teeth members. The pressure cam is circumferentially rotated so as to plastically deform one of the connecting elements when the large load capable of forcibly rotationally displacing the other of the connecting elements is applied thereto and a pressing force is applied to the pressure cam via the engagement teeth members.

According to the structure of the present invention, when the large load capable of forcibly rotationally displacing the other of the connecting elements is applied thereto, the pressure cam is circumferentially rotated by the engagement teeth members, so as to plastically deform one of the connecting elements. Thus, the pressure cam can also plastically deform one of the connecting elements, so as to receive the large load. Therefore, the locking strength of the reclining device can be further increased.

Further, the present invention can be constructed as follows. That is, the engagement teeth members are supported by first guide walls formed in one of the connecting elements so as to move only in predetermined radial directions. The pressure cam is supported by second guide walls formed in one of the connecting elements so as to move only in predetermined radial directions that are different from the moving directions of the engagement teeth members. When the large load capable of forcibly rotationally displacing the other of the connecting elements is applied thereto, the engagement teeth members are rotated in the same rotational direction as the other of the connecting elements, so as to press the first guide walls positioned adjacent thereto, thereby plastically deforming the same. Further, the pressure cam is applied with the pressing force due to rotational movement of the engagement teeth members and is rotated in the same rotational direction as the engagement teeth members, so as to press the second guide walls positioned adjacent thereto, thereby plastically deforming the same.

According to the structure of the present invention, when the large load capable of forcibly rotationally displacing the other of the connecting elements is applied thereto, the engagement teeth members can plastically deform the first guide walls positioned adjacent thereto. At the same time, the pressure cam can plastically deform the second guide walls positioned adjacent thereto. Thus, the engagement teeth members and the pressure cam respectively plastically deform one of the connecting elements, so as to receive the large load. Therefore, the locking strength of the reclining device can be further increased.

Further, the present invention can be constructed as follows. That is, each of the engagement teeth member is formed as a gate-shaped member in which a radially inner peripheral portion thereof is partially removed. Gatepost-shaped leg portions thereof are formed as pressure receiving portions that are pressed radially outwardly by contacting the pressure cam.

According to the structure of the present invention, because each of the engagement teeth member is formed as the gate-shaped member, the leg portions thereof can be easily buckled. However, the engagement teeth members can receive the applied large load without buckling because of the strength of each of the engagement teeth members that is different from the other of the connecting elements and the pressure cam.

BEST MODE FOR CARRYING OUT THE INVENTION

Figure 1:
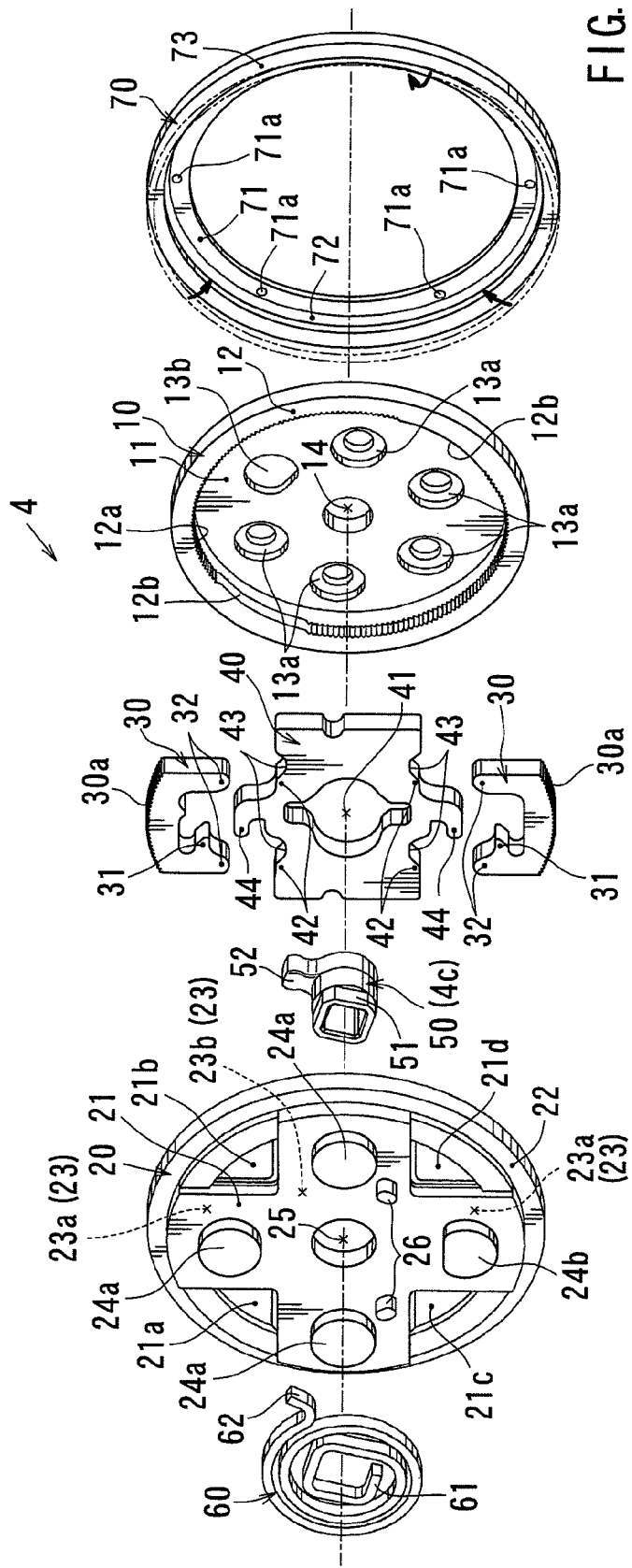
FIG. 1 is an exploded perspective view of a reclining device according to Embodiment 1.

In the following, a most preferred embodiment for carrying out the present invention will be described with reference to the drawings.

Embodiment 1

First, reclining devices 4 and 4 of a vehicle seat 1 of Embodiment 1 will be described with reference to FIGS. 1 to 8. FIG. 2 schematically shows a structure of the vehicle seat 1 of the present embodiment. In the vehicle seat 1, a seat back 2 as a backrest is connected to a seat cushion 3 as a seating member via a pair of reclining devices 4 and 4 that are disposed on both side lower portions of the seat back 2. In the reclining devices 4 and 4, operating shafts 4c and 4c for locking and unlocking the reclining devices 4 and 4 are integrally connected to each other via a connection rod 4r.

Thus, the reclining devices 4 and 4 can be simultaneously switched between locked conditions in which a tilt angle of the seat back 2 is fixed and unlocked conditions in which a fixed condition of the tilt angle of the seat back 2 is released such that the seat back tilt angle can be adjusted. Further, each of the reclining devices 4 and 4 is normally maintained in the locked condition by biasing. Also, the locked conditions of the reclining devices 4 and 4 can be simultaneously released by lifting up an operation lever 5 that is disposed in a side portion of the seat cushion 3.

Thus, the fixed condition of the tilt angle of the seat back 2 is released, so that the seat back tilt angle can be adjusted. When a releasing operation of the operation lever 5 is stopped after the tilt angle of the seat back 2 is adjusted, each of the reclining devices 4 and 4 is returned to the locked condition by biasing. As a result, the seat back 2 can be fixed while maintaining an adjusted tilt angle.

The seat back 2 is normally biased in a forward rotation direction by a biasing force of a biasing spring (not shown) that is disposed between the seat back 2 and the seat cushion 3. Therefore, when the locked conditions of the reclining devices 4 and 4 are released while a passenger does not sit on the vehicle seat 1, the seat back 2 can be rotated forwardly, so as to be folded on the seat cushion 3.

Each of the reclining devices 4 and 4, when positioned in an angular range in which the seat back 2 can be used as the backrest, can generally be returned to the locked condition due to biasing by stopping the releasing operation of the operation lever 5. However, rotational angular ranges of each of the reclining devices 4 and 4 includes an angular range that is referred to as a lockable rotational region and an angular range that is referred to as a free rotational region. In the lockable rotational region, each of the reclining devices 4 and 4 can be returned to the locked condition due to biasing when the releasing operation is stopped. Conversely, in the free rotational region, each of the reclining devices 4 and 4 cannot be returned to the locked condition even when the releasing operation is stopped.

Generally, the former lockable rotational region may preferably be formed so as to correspond to the angular range in which the seat back 2 can be used as the backrest, in particular, so as to correspond to a rotational range between a substantially vertical position and a farthest rearward rotational position of the seat back 2. Conversely, the latter free rotational region may preferably be formed so as to correspond to a forwardly tilted angular range in which the seat back 2 cannot be used as the backrest, in particular, so as to correspond to a rotational range between the substantially vertical position and a farthest forward rotational position of the seat back 2.

Therefore, when the locked condition of each of the reclining devices 4 and 4 is released in order to rotate the seat back 2 forwardly, the seat back 2 can be automatically rotated forwardly until it is folded on the seat cushion 3 even when the releasing operation is stopped, provided that the seat back 2 is tilted forwardly from the substantially vertical position if only a little. In the following, a structure of each of the reclining devices 4 and 4 will be described in detail. Further, the reclining devices 4 and 4 respectively have the substantially same construction as each other with the exception of one aspect that they are formed so as to be opposite to each other. Therefore, the reclining device 4 that is shown in the right side in FIG. 2 will be described hereinafter.

Figure 2:
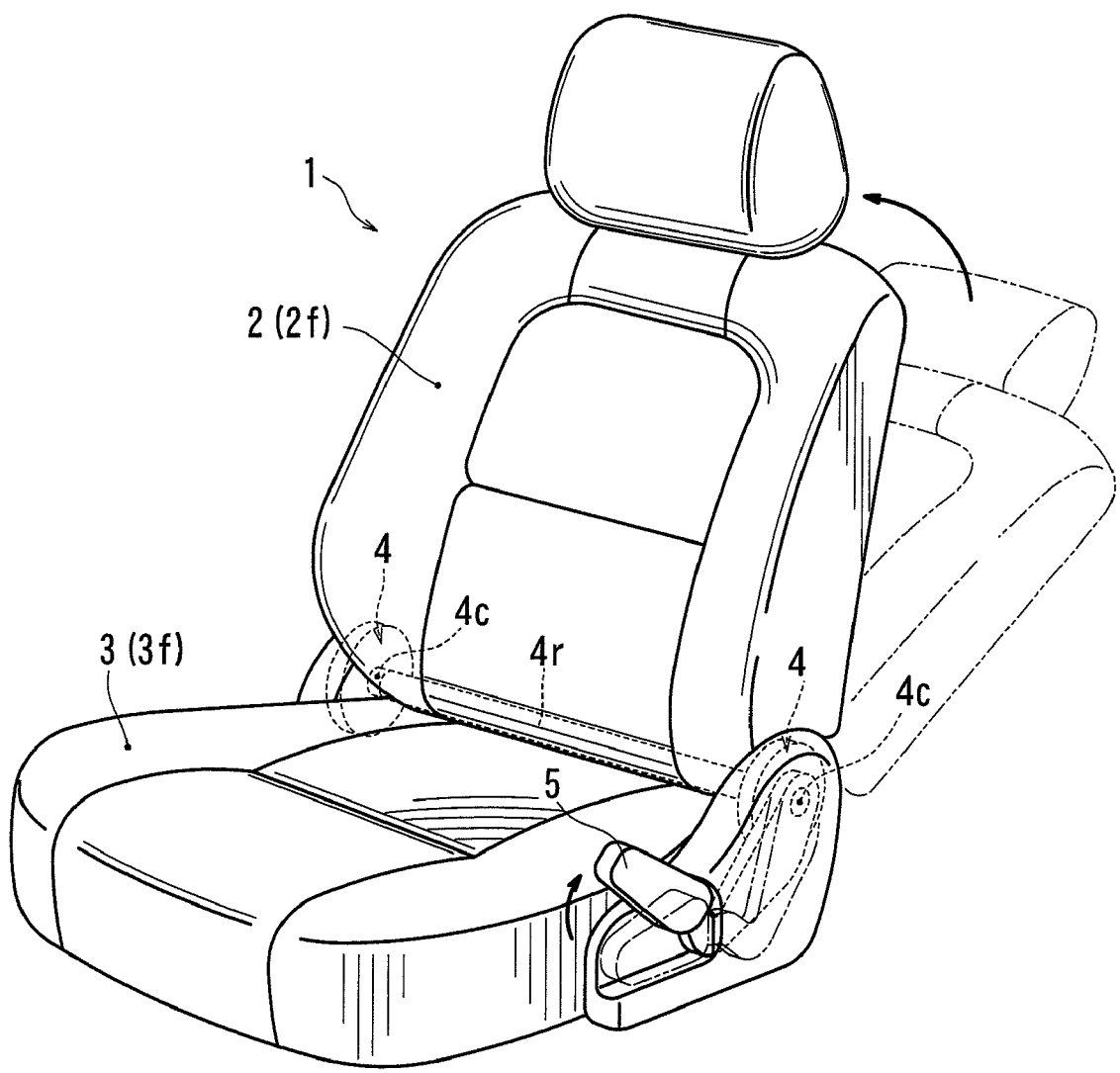
FIG. 2 is a schematic perspective view of a vehicle seat.

As shown in FIG. 1, the reclining device 4 includes a disk-shaped ratchet 10, a disk-shaped guide 20, a pair of slide pawls 30 and 30 positioned above and below and a slide cam 40 that are respectively disposed between disk surfaces of the ratchet 10 and the guide 20, a hinge cam 50 that is capable of sliding the slide cam 40, a biasing spring 60 that is capable of rotationally biasing the hinge cam 50, and an outer circumferential ring 70 that is capable of clamping the ratchet 10 and the guide 20 in a thickness direction (an axial direction). These construction elements are assembled as a unit.

The guide 20 corresponds to one of connecting elements of the present invention. Conversely, the ratchet 10 corresponds to the other of the connecting elements of the present invention. The slide pawls 30 and 30 correspond to engagement teeth members of the present invention. Further, the slide cam 40 corresponds to a pressure cam of the present invention. In the following, structures of the elements described above will be described in further detail. First, the structure of the ratchet 10 will be described.

In particular, the ratchet 10 has a cylindrical portion 12 that is projected from an outer circumferential periphery of a disk-shaped portion 11 and in the thickness direction. The cylindrical portion 12 is formed by half die-cutting the outer circumferential periphery of the disk-shaped portion 11 in the thickness direction. The cylindrical portion 12 includes toothed surfaces each having inwardly-faced teeth 12a, and non-toothed even projected portions 12b and 12b. The toothed surfaces and the projected portions 12b and 12b are formed in an inner circumferential surface of the cylindrical portion 12 so as to be circumferentially positioned side by side with each other. Further, the projected portions 12b and 12b are axisymmetrically formed in two locations of the inner circumferential surface of the cylindrical portion 12. Each of the projected portions 12b and 12b is formed as an even curved surface that is more protruded radially inwardly than the inwardly-faced teeth 12a.

Figure 6:
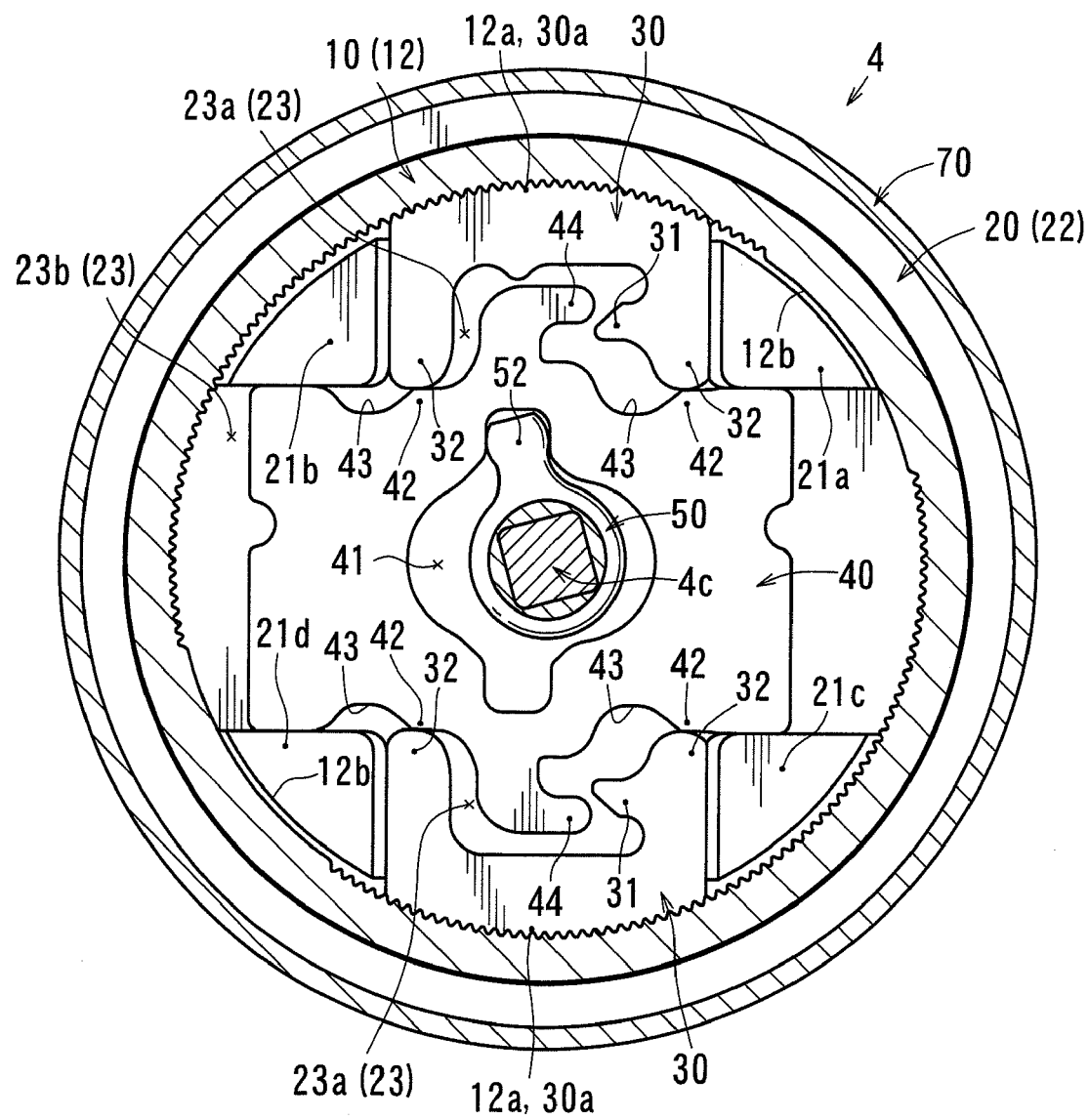
FIG. 6 is a cross-sectional view taken along line VI-VI in FIG. 3, which illustrates a condition in which the reclining device is locked.

As shown in FIG. 6, when the projected portions 12b and 12b are circumferentially positioned so as to not interfere with either of the pawls 30 and 30, radially-outwardly directed locking movements of the pawls 30 and 30 are allowed, so that the pawls 30 and 30 can mesh with the inwardly-faced teeth 12a of the ratchet 10. Therefore, such a circumferentially rotational angular range in which the projected portions 12b and 12b do not interfere with each of the pawls 30 and 30 can be determined as the lockable rotational region in which the pawls 30 and 30 are allowed to mesh with the inwardly-faced teeth 12a of the ratchet 10.

However, when the projected portions 12b and 12b are circumferentially positioned so as to interfere with the pawls 30 and 30, the pawls 30 and 30 can contact the projected portions 12b and 12b. Therefore, the locking movements of the pawls 30 and 30 are prevented, so that the pawls 30 and 30 can be avoided from meshing with the inwardly-faced teeth 12a of the ratchet 10. Therefore, the circumferentially rotational angular range in which the projected portions 12b and 12b interfere with each of the pawls 30 and 30 can be determined as the free rotational region in which the pawls 30 and 30 are not allowed to mesh with the inwardly-faced teeth 12a of the ratchet 10.

Figure 3:
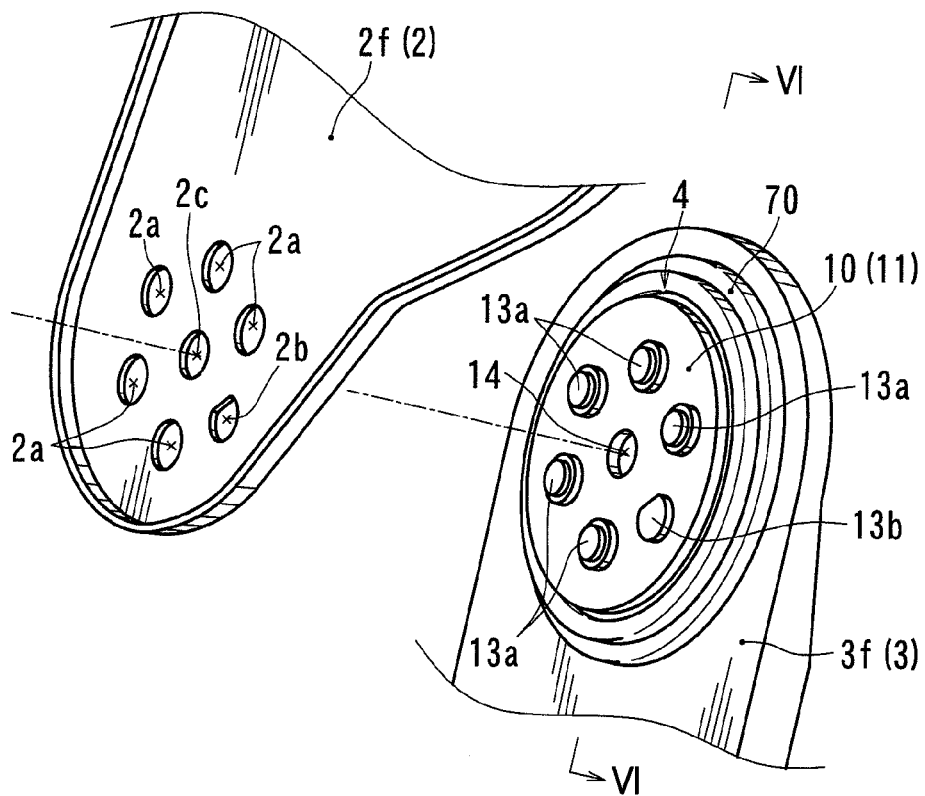
FIG. 3 is a perspective view of the reclining device in an attached condition.

As shown in FIG. 3, an outer disk surface of the disk-shaped portion 11 of the ratchet 10 is bonded to a plate surface of a back frame 2f, i.e., a framework, of the seat back 2, so that the ratchet 10 is integrally connected to the seat back 2.

Further, the ratchet 10 has a plurality of dowels 13a. and a D-shaped dowel 13b that are respectively formed in the disk-shaped portion 11 thereof. The dowels 13a. are cylindrically projected from the outer disk surface of the disk-shaped portion 11. The dowels 13a. and the D-shaped dowel 13b are positioned adjacent to the outer circumferential periphery of the disk-shaped portion 11 and are circumferentially positioned at equal intervals.

Figure 5:
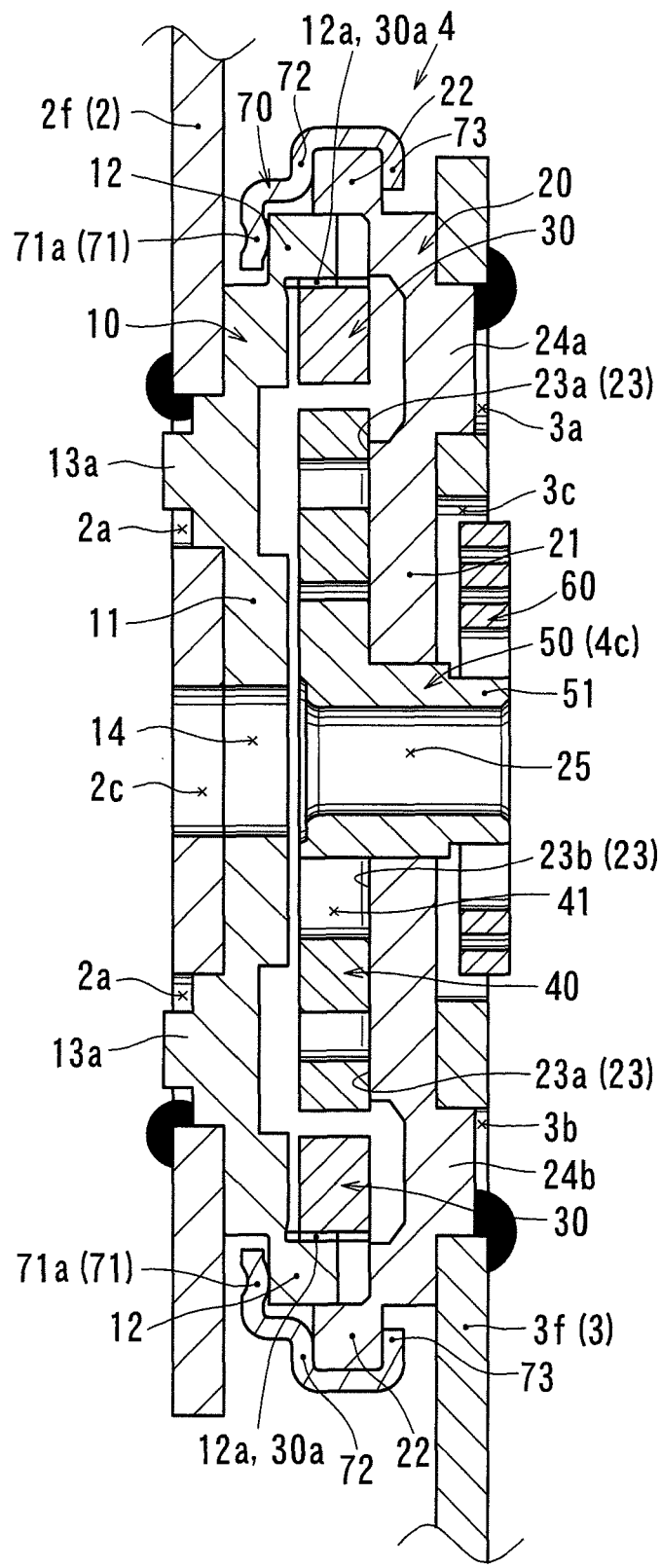
FIG. 5 is a cross-sectional view taken along line V-V in FIG. 4.

Further, the D-shaped dowel 13b is formed by partially removing a cylindrical dowel so as to have a D-shape in cross section. Therefore, the D-shaped dowel 13b can be distinguished from the dowels 13a. that are cylindrically projected. Conversely, the back frame 2f has dowel insertion holes 2a. and a D-dowel insertion hole 2b that are penetrated therethrough. The dowel insertion holes 2a. and the D-dowel insertion hole 2b are shaped such that the dowels 13a. and the D-shaped dowel 13b can be fitted thereinto. Therefore, the ratchet 10 is securely integrally attached to the back frame 2f by fitting the dowels 13a. and the D-shaped dowel 13b to the dowel insertion holes 2a. and the D-dowel insertion hole 2b formed in the back frame 2f and then welding fitted portions (FIG. 5).

Formed in a central portion of the disk-shaped portion 11 of the ratchet 10 is a through hole 14 into which the operating shaft 4c (FIG. 2) for locking and unlocking the reclining device 4 is inserted. Further, a through bore 2c is formed in the back frame 2f for the same purpose as the through hole 14. The through bore 2c is axially aligned with the through hole 14.

Next, with reference to FIG. 1 again, the structure of the guide 20 will be described. The guide 20 is formed as a disk-shaped member having a diameter slightly greater than the diameter of the ratchet 10. The guide 20 has a disk-shaped portion 21 and a cylindrical portion 22. The cylindrical portion 22 is cylindrically projected from an outer circumferential periphery of the disk-shaped portion 21 in a thickness direction, i.e., toward a coupling direction of the guide 20 to the ratchet 10. The cylindrical portion 22 is formed by half die-cutting the outer circumferential periphery of the disk-shaped portion 21 in the thickness direction. As shown in FIG. 5, the cylindrical portion 22 is shaped to surround the cylindrical portion 12 of the ratchet 10 from an outer circumferential side thereof.

Figure 4:
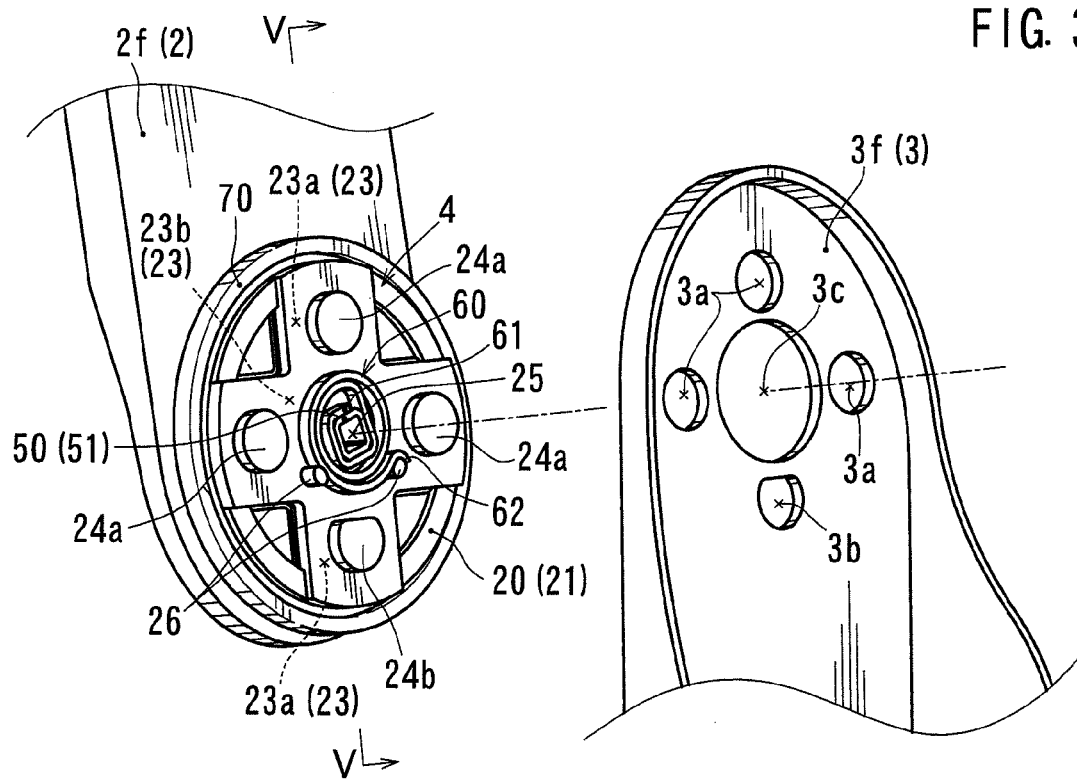
FIG. 4 is a perspective view of the reclining device in the attached condition.

In a condition in which the cylindrical portion 12 of the ratchet 10 is incorporated into the cylindrical portion 22, the cylindrical portions 12 and 22 are fitted to each other while nested to each other, so that the guide 20 and the ratchet 10 can slidably rotate relative to each other while. As shown in FIG. 4, an outer disk surface of the disk-shaped portion 21 of the guide 20 is bonded to a plate surface of a cushion frame 3f, i.e., a framework, of the seat cushion 3, so that the guide 20 is integrally connected to the seat cushion 3.

Further, the guide 20 has a plurality of dowels 24a. and a D-shaped dowel 24b that are respectively formed in the disk-shaped portion 21 thereof. The dowels 24a. are cylindrically projected from the outer disk surface of the disk-shaped portion 21. The dowels 24a. and the D-shaped dowel 24b are positioned adjacent to the outer circumferential periphery of the disk-shaped portion 21 and are circumferentially positioned at equal intervals. Further, the D-shaped dowel 24b is formed by partially removing a cylindrical dowel so as to have a D-shape in cross section. Therefore, the D-shaped dowel 24b can be distinguished from the dowels 24a. that are cylindrically projected.

Conversely, the cushion frame 3f has dowel insertion holes 3a. and a D-dowel insertion hole 3b that are penetrated therethrough. The dowel insertion holes 3a. and the D-dowel insertion hole 3b are shaped such that the dowels 24a. and the D-shaped dowel 24b can be fitted thereinto. Therefore, the guide 20 is securely integrally attached to the cushion frame 3f by fitting the dowels 24a. and the D-shaped dowel 24b to the dowel insertion holes 3a. and the D-dowel insertion hole 3b formed in the cushion frame 3f and then welding fitted portions (FIG. 5).

Formed in a central portion of the disk-shaped portion 21 of the guide 20 is a through hole 25 into which the operating shaft 4c (FIG. 2) for locking and unlocking the reclining device 4 is inserted. Further, a through bore 3c is formed in the cushion frame 3f for the same purpose as the through hole 25, so as to be axially aligned with the through hole 25. The through bore 3c is enlarged such that the biasing spring 60, which will be hereinafter described, can be received therein.

With reference to FIG. 1 again, the guide 20 has a cross-shaped guide groove 23 that is formed in the disk-shaped portion 21 thereof by depressing an inner disk surface thereof in the thickness direction. The guide groove 23 is formed by half die-cutting the disk-shaped portion 21 in a cross shape in the thickness direction. Further, the dowels 24a. and the D-shaped dowel 24b are formed to be projected from the outer disk surface in which the guide groove 23 are formed.

Figure 7:
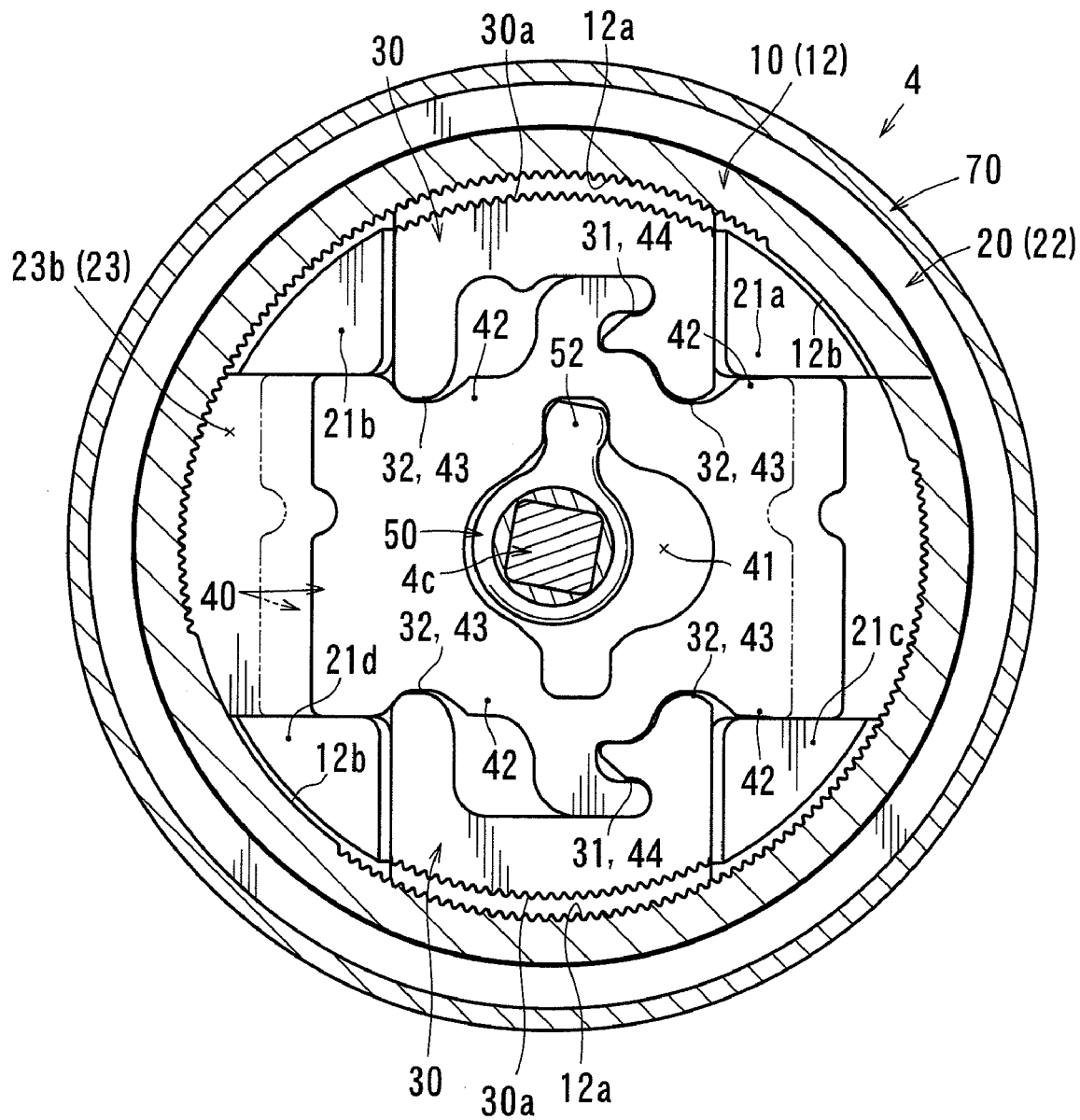
FIG. 7 is a cross-sectional view, which illustrates a condition in which the reclining device shown in FIG. 6 is unlocked.

In the guide groove 23, upper and lower groove portions thereof are respectively formed as pawl grooves 23a and 23a that are capable of receiving the pawls 30 and 30 therein, which will be hereinafter described. As shown in FIG. 7, the pawl grooves 23a and 23a are defined by guide walls 21a and 21b and guide walls 21c and 21d that can function as right and left walls, and are capable of guiding the pawls 30 and 30 so as to slide the same only radially inwardly and outwardly of the guide 20 (upwardly and downwardly in the drawings) therealong.

Further, in the guide groove 23, right and left groove portions thereof and a middle groove portion positioned therebetween are formed as a laterally continuous slide cam groove 23b that is capable of receiving the slide cam 40 therein, which will be hereinafter described. The slide cam groove 23b is defined by the guide walls 21a and 21c and the guide walls 21b and 21d that can function as upper and lower walls, and is capable of guiding the slide cam 40 so as to slide the same only radially inwardly and outwardly of the guide 20 (rightwardly and leftwardly in the drawings) therealong.

Further, with reference to FIG. 1 again, the guide 20 has spring engagement portions 26 and 26 that are respectively formed in the disk-shaped portion 21 thereof. Each of the spring engagement portions 26 and 26 is projected from the outer disk surface of the disk-shaped portion 21 and has a pin shape. Each of the spring engagement portions 26 and 26 is formed as a functional element to which an outer end 62 of the biasing spring 60 (a coil spring) is attached, which will be described hereinbefore. Further, the spring engagement portions 26 and 26 are positioned in circumferentially two locations, so that an attaching position of the outer end 62 of the biasing spring 60 can be changed.

Next, the structures of the pawls 30 and 30 will be described. The pawls 30 and 30 are formed as piece-shaped members that are radially slidably received in the pawl grooves 23a and 23a formed in the guide 20 previously described. Each of the pawls 30 and 30 is made of a hot-rolled steel sheet (Carbon Steel; S28C) and is refined by general heat treatment (hardening/annealing). Therefore, each of the pawls 30 and 30 has a surface portion that is hardened to have increased abrasion resistance, and a core portion having an increased hardness and toughness.

The pawls 30 and 30 are formed vertically symmetrically with each other. In particular, a radially outer circumferential periphery of each of the pawls 30 and 30 is formed to an arcuate shape so as to correspond to the inner circumferential surface of the cylindrical portion 12 of the ratchet 10. Further, formed in arcuately curved outer circumferential surfaces of the pawls 30 and 30 are outwardly-faced toothed portions 30a and 30a that are capable of meshing with the inwardly-faced teeth 12a of the ratchet 10. Therefore, as shown in FIG. 6, when the pawls 30 and 30 are pressed by the slide cam 40, which will be hereinafter described, and are slid radially outwardly, the outwardly-faced toothed portions 30a and 30a can mesh with the inwardly-faced teeth 12a of the ratchet 10.

As a result, the pawls 30 and 30 and the ratchet 10 can engage each other, so as to be circumferentially integrated with each other. However, the pawls 30 and 30 can only slide radially inwardly and outwardly with respect to the guide 20 due to the guide walls 21a and 21b and the guide walls 21c and 21d. Therefore, the ratchet 10 can be prevented from relatively rotating with respect to the guide 20 via the pawls 30 and 30.

Thus, the reclining device 4 can be positioned in a rotationally locked condition. As shown in FIG. 6, the rotationally locked condition of the reclining device 4 can be released when the pawls 30 and 30 are retracted radially inwardly and are disengaged from the ratchet 10.

The pawls 30 and 30 can be pushed radially outwardly or pulled radially inwardly when the slide cam 40 disposed between the pawls 30 and 30 is slid. As shown in FIG. 1, the slide cam 40 is formed as a piece-shaped member that is capable being received in the slide cam groove 23b formed in the guide 20 described above. The slide cam 40 is made of the hot-rolled steel sheet (Carbon Steel; S28C) and is refined by general heat treatment (hardening/annealing). Therefore, the slide cam 40 has a surface portion that is hardened to have increased abrasion resistance, and a core portion having an increased hardened and toughness.

However, the slide cam 40 is treated at an annealing temperature that is different from the annealing temperature of the pawls 30 and 30, so as to be softer than the pawls 30 and 30. The slide cam 40 is vertically symmetrically shaped. In particular, the slide cam 40 has shoulder portions 42 and 42 that are capable of pushing the pawls 30 and 30 radially outwardly, and hooks 44 and 44 that are capable of pulling the pawls 30 and 30 radially inwardly. The shoulder portions 42 and 42 and the hooks 44 and 44 are respectively formed in upper and lower peripheries of the slide cam 40.

Each of the pawls 30 and 30 is formed as a gate-shaped member in which a radially inner peripheral portion thereof is partially removed. Each of the pawls 30 and 30 is disposed while gatepost-shaped legs thereof, i.e., leg portions 32 and 32, contact an upper peripheral surface portion or a lower peripheral surface portion of the slide cam 40. Therefore, the pawls 30 and 30 can respectively be pressed radially outwardly when the slide cam 40 is slid.

In particular, as shown in FIG. 6, when the slide cam 40 is slid leftwardly, the leg portions 32 and 32 can be positioned on the shoulder portions 42 and 42 of the slide cam 40, so that each of the pawls 30 and 30 can be maintained in a condition in which it is pushed radially outwardly. Thus, each of the pawls 30 and 30 is maintained in a condition in which each of the outwardly-faced toothed portions 30a and 30a meshes with the inwardly-faced teeth 12a of the ratchet 10.

As shown in FIG. 7, when the slide cam 40 is slid rightwardly, the hooks 44 and 44 of the slide cam 40 are hooked on engagement portions 31 and 31 formed in the gate-shaped inner peripheral portions of the pawls 30 and 30, so that the pawls 30 and 30 can be pulled radially inwardly. As a result, the leg portions 32 and 32 positioned on the shoulder portions 42 and 42 of the slide cam 40 are introduced into recessed portions 43 and 43 that are positioned left sides thereof, so that the pawls 30 and 30 can be disengaged from the ratchet 10.

The recessed portions 43 and 43 are formed to be smoothly hollowed from the shoulder portions 42 and 42. Therefore, when the slide cam 40 is slid leftwardly from a condition shown in FIG. 7, the leg portions 32 and 32 of each of the pawls 30 and 30 can move along profiles of the recessed portions, so as to be positioned on the shoulder portions 42 and 42 (FIG. 6).

The slide cam 40 described above can be slid rightwardly and leftwardly in the drawings when the hinge cam 50 is rotationally moved. The hinge cam 50 is disposed in a cam hole 41 that is formed through a central portion of the slide cam 40. As shown in FIG. 1, the hinge cam 50 is rotatably positioned in the cam hole 41 that is formed through the central portion of the slide cam 40. Further, the hinge cam 50 is constantly rotationally biased clockwise in FIG. 1 by a biasing force of the biasing spring 60 (the coil spring) that is attached between the hinge cam 50 and the guide 20.

As shown in FIG. 4, an inner end 61 of the biasing spring 60 is connected to a spring engagement portion 51 of the hinge cam 50. Conversely, the outer end 62 of the biasing spring 60 is connected to the spring engagement portion 26 of the guide 20. Therefore, as shown in FIG. 6, the hinge cam 50 can normally press the slide cam 40 from an inner surface side of the cam hole 41 via a projection 52 formed in an outer circumferential portion of the hinge cam 50, so as to slide the slide cam 40 leftwardly in the drawings.

As a result, the leg portions 32 and 32 can be positioned on the shoulder portions 42 and 42 of the slide cam 40, so that each of the pawls 30 and 30 can be maintained in an engaged and locked condition in which each of the pawls 30 and 30 meshes with the inwardly-faced teeth 12a of the ratchet 10. The hinge cam 50 is integrally connected to the operating shaft 4c that is previously described with reference to FIG. 2. Therefore, when the operation lever 5 (FIG. 2) is lifted up, the hinge cam 50 can be rotated counterclockwise against the biasing of the biasing spring 60 that is described above with reference to FIG. 1.

That is, when the operation lever 5 is lifted up, the hinge cam 50 can be rotated clockwise in FIG. 6. As a result, as shown in FIG. 7, the slide cam 40 can be slid rightwardly, so that the pawls 30 and 30 can be disengaged from the ratchet 10.

Next, with reference to FIG. 1 again, the outer circumferential ring 70 will be described. The outer circumferential ring 70 is formed by stamping a thin steel sheet to a ring shaped member and then by axially half die-cutting the ring shaped member. The outer circumferential ring 70 thus formed has a cylindrical shape and includes a flange-shaped first bearing surface portion 71 and a second bearing surface portion 72 that are respectively axially faced. The first bearing surface portion 71 and the second bearing surface portion 72 are formed in a back side end of the outer circumferential ring 70 so as to be respectively axially displaced to each other. As shown in FIG. 5, the first bearing surface portion 71 axially faces an outer disk surface of the cylindrical portion 12 of the ratchet 10 when the ratchet 10 is disposed in a cylindrical interior of the outer circumferential ring 70.

Conversely, the second bearing surface portion 72 faces and contacts an inner disk surface of the cylindrical portion 22 of the guide 20 when the guide 20 is disposed in the cylindrical interior of the outer circumferential ring 70. Further, the second bearing surface portion 72 includes a cylindrical portion that is axially cylindrically projected from an outer circumferential periphery thereof. A periphery of the cylindrical portion is formed as a bendable portion 73 that is capable of being bent and crimped radially inwardly after the ratchet 10 and the guide 20 are disposed in the outer circumferential ring 70.

Therefore, when the ratchet 10 is axially inserted into the cylindrical interior of the outer circumferential ring 70 thus constructed, the outer disk surface of the cylindrical portion 12 of the ratchet 10 can contact an inner disk surface of the first bearing surface portion 71 via point contact of projections 71a formed therein. Thus, the ratchet 10 can be incorporated into the outer circumferential ring 70 while it is axially positioned. When the ratchet 10 is thus incorporated, an outer circumferential peripheral portion of the cylindrical portion 12 of the ratchet 10 can be surrounded by a cylindrical portion of the outer circumferential ring 70, i.e., a connecting portion of the first bearing surface portion 71 and the second bearing surface portion 72.

Next, the pawls 30 and 30, the slide cam 40 and the other components are disposed on the disk-shaped portion 11 of the ratchet 10. Thereafter, the guide 20 is inserted into the cylindrical interior of the outer circumferential ring 70. As a result, the inner disk surface of the cylindrical portion 22 of the guide 20 can contact the second bearing surface portion 72. Thus, the guide 20 can be incorporated into the outer circumferential ring 70 while it is axially positioned.

Subsequently, the periphery of the cylindrical portion (the bendable portion 73) that is projected beyond an outer disk surface of the cylindrical portion 22 of the guide 20 is bent radially inwardly and is then crimped onto the outer disk surface of the cylindrical portion 22. As a result, the outer circumferential ring 70 can be integrally connected to the guide 20. Thus, the ratchet 10 and the guide 20 can be coupled to each other by the outer circumferential ring 70 while they are prevented from being axially separated from each other.

With reference to FIG. 5, the cylindrical portion 12 of the ratchet 10 is shaped such that a small clearance is formed between the cylindrical portion 12 and both of the disk-shaped portion 21 of the guide 20 and the first bearing surface portion 71 of the outer circumferential ring 70 when the ratchet 10 and the guide 20 are coupled to each other while the pawls 30 and 30, the slide cam 40 and the other components are disposed therebetween. Therefore, rotational movement of the ratchet 10 relative to the guide 20 can be smoothly performed without being encumbered by slide friction against the outer circumferential ring 70.

As previously described with reference to FIG. 6, the reclining device 4 is maintained in the rotationally locked condition due to engagement of the pawls 30 and 30 and the ratchet 10. In the engaged and locked condition in which the pawls 30 and 30 engage the ratchet 10, even when a seat back load is applied to the seat back by a sitting person and as a result, a rotational load is applied to the ratchet 10, such a rotational load can be borne due to bearing performance of the guide walls 21a and 21b and the guide walls 21c and 21d of the guide 20 circumferentially supporting the pawls 30 and 30 and bearing performance of the slide cam 40 radially supporting the pawls 30 and 30 from inside.

Figure 8:
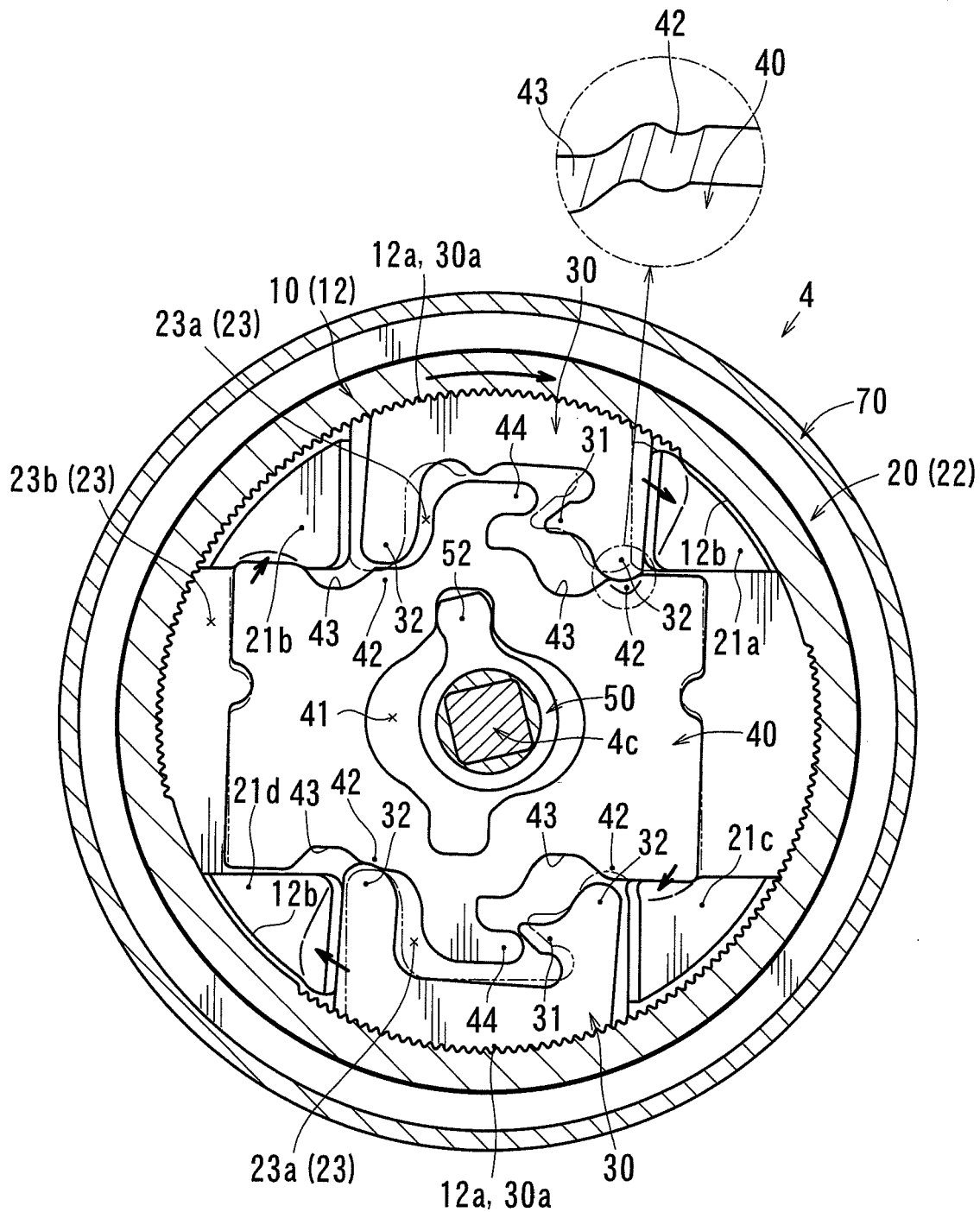
FIG. 8 is a cross-sectional view, which illustrates a condition in which the reclining device shown in FIG. 6 is deformed by a large load applied thereto.

However, as shown in FIG. 8, when a large load is applied to the seat back 2 from before or behind due to a collision of a heavy article against the seat back 2, which is caused by, for example, a vehicle back-side collision, a large load capable of forcibly rotationally displacing the ratchet 10 relative to the guide 20 can be applied to the reclining device 4. As a result, the pawls 30 and 30 engaging the ratchet 10 can be forcibly rotated with the ratchet 10 in the same direction. Consequently, the pawls 30 and 30 can press the guide walls 21a and 21d (first guide walls) positioned adjacent thereto in a rotational direction thereof, so as to plastically deform the same.

Further, when the pawls 30 and 30 are integrally rotated with the ratchet 10, one of the leg portions 32 and 32 of each of the pawls 30 and 30 can be pressed against the corresponding shoulder portions 42 and 42 of the slide cam 40. As a result, the shoulder portions 42 and 42 can be plastically deformed and depressed. Further, because each of the pawls 30 and 30 has a hardness greater than the slide cam 40, each of the pawls 30 and 30 can press the shoulder portions 42 and 42 of the slide cam 40 without buckling of the leg portions 32 and 32.

When a pressing force is applied to the slide cam 40 from the pawls 30 and 30, the slide cam 40 is axisymmetrically pressed by couple applied thereto, so as to be forcibly rotated in the same direction as the pawls 30 and 30. As a result, the slide cam 40 can press the guide walls 21b and 21c (second guide walls) positioned adjacent thereto in a rotational direction thereof, so as to plastically deform the same.

Thus, when the large load capable of forcibly rotationally displacing the ratchet 10 is applied to the ratchet 10, the pawls 30 and 30 are pressed against the guide walls 21a and 21d of the guide 20 and the slide cam 40 without buckling of the leg portions 32 and 32 of the pawls 30 and 30, so as to plastically deform the same. Further, at this time, the slide cam 40 is rotated and is pressed against the guide walls 21b and 21c, so as to plastically deform the same. Therefore, the reclining device 4 can bear such a large load.

In particular, the slide cam 40 is increased in toughness by controlling the annealing temperature. Therefore, even when the large pressing force is applied to the slide cam 40 via the leg portions 32 and 32 of the pawls 30 and 30, the slide cam 40 can receive such a pressing force without producing cracks and fracturing. As a result, even when the large load that can forcibly rotationally displace the ratchet 10 is applied to the ratchet 10, a supporting structure in which the leg portions 32 and 32 of the pawls 30 and 30 are supported by the slide cam 40 cannot be broken, so that the reclining device 4 can be maintained in the rotationally locked condition. Consequently, the reclining device 4 can have an increased locking strength.

The present invention has been described using one embodiment. However, various changes and modifications may be made to the present invention. For example, the reclining device can be used to connect the seat back to a vehicle floor such that the tilt angle of the seat back can be adjusted. Further, in the embodiment, the engagement teeth members (the pawls) are constructed to mesh with the inwardly-faced toothed portions of the other of the connecting elements (the ratchet) when they are moved radially outwardly with respect to one of connecting elements (the guide). However, the engagement teeth members (the pawls) can be constructed to mesh with the inwardly-faced toothed portions of the other of the connecting elements (the ratchet) when they are moved radially outwardly with respect to one of connecting elements (the guide) while rotating.

The invention claimed is:

1. A vehicle seat reclining device that is capable of connecting a seat back of a vehicle seat to a fixed body such as a seat cushion and a floor such that a tilt angle of the seat back can be adjusted, comprising:
   two connecting elements respectively having disk-shaped portions that are respectively integrally connected to the seat back or the fixed body and are oppositely coupled to each other so as to be rotatable relative to each other,
   engagement teeth members disposed between the two connecting elements,
   the engagement teeth members being attached to one of the connecting elements while circumferentially supported, so as to prohibit relative rotation of the connecting elements when outer circumferential toothed surfaces formed therein are meshed with inner circumferential toothed surfaces formed in the other of the connecting elements, and
   a pressure cam capable of pressing the engagement teeth members radially outwardly when moved by biasing, so as to mesh with the inner circumferential toothed surfaces formed in the other of the connecting elements,
   wherein the pressure cam is attached to one of the connecting elements and is movable on a linearly oscillating path in a direction perpendicular to moving directions of the engagement teeth members,
   wherein each of the engagement teeth members has a hardness greater than the pressure cam, and
   wherein when a large load capable of forcibly rotationally displacing the other of the connecting elements is applied thereto while the engagement teeth members engage the other of the connecting elements, the engagement teeth members are pressed by the other of the connecting elements in a radially inward direction in which the engagement teeth members are disengaged therefrom, so as to press the pressure cam with an increased buckling strength and plastically deform the same.

2. The vehicle seat reclining device as defined in claim 1, wherein the pressure cam is circumferentially rotated so as to plastically deform one of the connecting elements when the large load capable of forcibly rotationally displacing the other of the connecting elements is applied thereto and a pressing force is applied to the pressure cam via the engagement teeth members.

3. The vehicle seat reclining device as defined in claim 1, wherein the engagement teeth members are supported by first guide walls formed in one of the connecting elements so as to move only in predetermined radial directions,
   wherein the pressure cam is supported by second guide walls formed in one of the connecting elements so as to move only in predetermined radial directions that are different from the moving directions of the engagement teeth members, and
   wherein when the large load capable of forcibly rotationally displacing the other of the connecting elements is applied thereto, the engagement teeth members are rotated in the same rotational direction as the other of the connecting elements, so as to press the first guide walls positioned adjacent thereto, thereby plastically deforming the same, and
   the pressure cam is applied with the pressing force due to rotational movement of the engagement teeth members and is rotated in the same rotational direction as the engagement teeth members, so as to press the second guide walls positioned adjacent thereto, thereby plastically deforming the same.

4. The vehicle seat reclining device as defined in claim 1, wherein each of the engagement teeth members is formed as a gate-shaped member in which a radially inner peripheral portion thereof is partially removed, and
   wherein gatepost-shaped leg portions thereof are formed as pressure receiving portions that are pressed radially outwardly by contacting the pressure cam.

* * * * *